United States Patent
Schenk

(10) Patent No.: US 7,161,981 B2
(45) Date of Patent: Jan. 9, 2007

(54) DECISION FEEDBACK EQUALIZING DEVICE

(75) Inventor: Heinrich Schenk, München (DE)

(73) Assignee: Infineon Technologies AG, Munich ( * ) Notice: Subject to any disclaimer, the term of this patent is extended or adjusted under 35 U.S.C. 154(b) by 582 days.

(21) Appl. No.: 10/466,502

(22) PCT Filed: Dec. 18, 2001

(86) PCT No.: PCT/EP01/14942

§ 371 (c)(1),
(2), (4) Date: Nov. 4, 2003

(87) PCT Pub. No.: WO02/058353

PCT Pub. Date: Jul. 25, 2002

(65) Prior Publication Data

US 2004/0057513 A1 Mar. 25, 2004

(30) Foreign Application Priority Data

Jan. 17, 2001 (DE) .................. 101 01 950

(51) Int. Cl.
*H03H 7/40* (2006.01)
*H03H 7/30* (2006.01)

(52) U.S. Cl. ..................... 375/233; 375/232

(58) Field of Classification Search ........ 375/231–233, 375/235, 243, 245, 254, 261, 270, 277–278, 375/340, 346, 285, 321, 350; 708/316, 322; 455/109, 204, 203

See application file for complete search history.

(56) References Cited

U.S. PATENT DOCUMENTS

| | | | |
|---|---|---|---|
| 5,513,216 A * | 4/1996 | Gadot et al. | 375/233 |
| 5,517,527 A | 5/1996 | Yu | |
| 5,561,687 A * | 10/1996 | Turner | 375/233 |
| 5,572,262 A * | 11/1996 | Ghosh | 348/607 |
| 5,692,011 A | 11/1997 | Nobakht et al. | |
| 6,285,709 B1 * | 9/2001 | Alelyunas et al. | 375/233 |
| 6,621,863 B1 * | 9/2003 | Ido | 375/232 |

FOREIGN PATENT DOCUMENTS

EP 0 707 400 4/1996

* cited by examiner

*Primary Examiner*—Mohammed Ghayour
*Assistant Examiner*—Sophia Vlahos
(74) *Attorney, Agent, or Firm*—Fish & Richardson P.C.

(57) ABSTRACT

A decision feedback equalizer device includes a linear equalizer stage, which has at least one first digital filter with an adjustable first set of coefficients. The equalizer device also includes a decision feedback equalizer stage, which is connected downstream of the linear equalizer stage. The decision feedback equalizer stage includes a summer, to which an output signal of the linear equalizer stage is fed. The decision feedback equalizer stage also includes a decision unit, to which an output signal of the summer is fed. The decision feedback equalizer stage also includes a decision feedback equalizer, to which an output signal of the decision unit is fed and which has at least one second digital filter with an adaptively adjustable second set of coefficients and which supplies an output signal, which is fed to the summer.

10 Claims, 3 Drawing Sheets

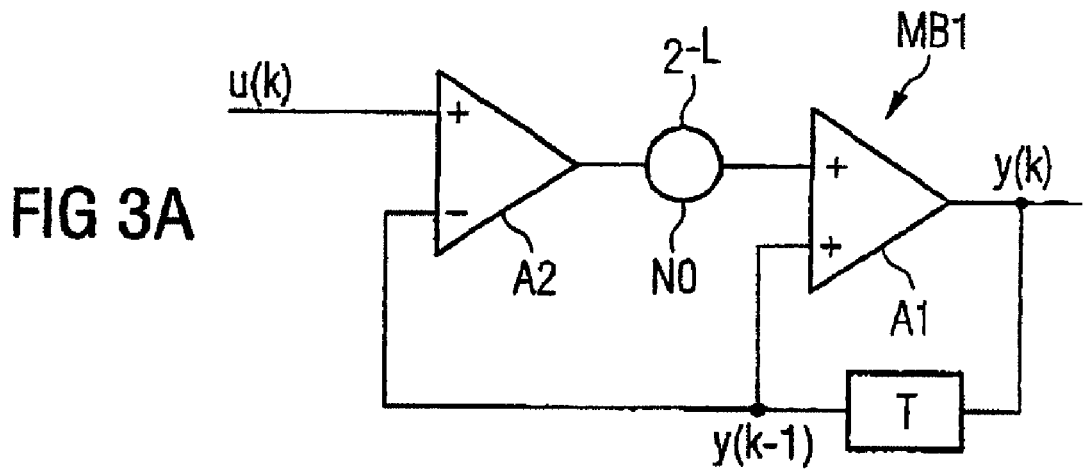
FIG 3A
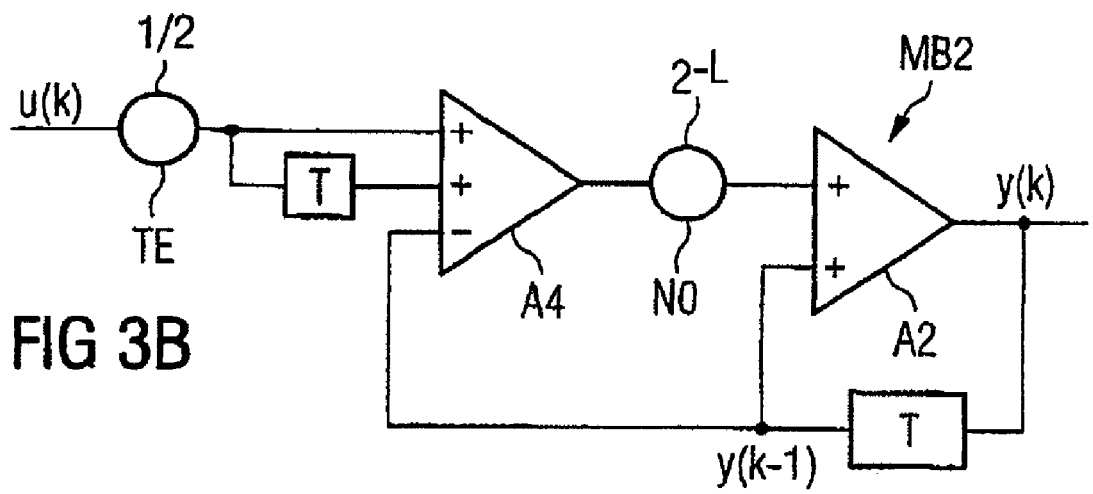
FIG 3B
FIG 4
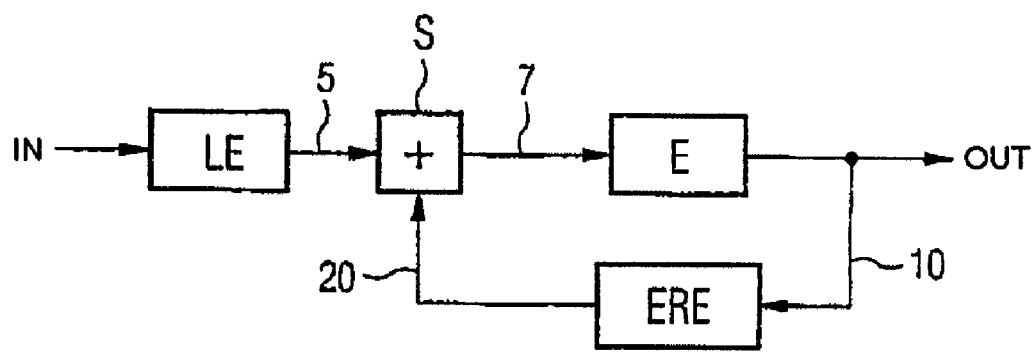
PRIOR ART

PRIOR ART

DECISION FEEDBACK EQUALIZING DEVICE

FIELD OF INVENTION

The present invention relates to decision feedback equalizer devices having a linear equalizer stage, which has at least one first linear digital filter with an adjustable first set of coefficients; and a decision feedback equalizer stage, which is connected downstream of the linear equalizer stage and has: a summer, to which an output signal of the linear equalizer stage can be fed; a decision unit, to which an output signal of the summer can be fed and which has at least one second digital filter with an adaptively adjustable second set of coefficients; and a decision feedback equalizer, to which an output signal of the decision unit can be fed and which supplies an output signal, which can be fed to the summer; the first set of coefficients comprising a first adjustable portion arranged behind a main coefficient, and a second adaptively adjustable portion extending up to the main coefficient.

A decision feedback equalizer device but extended in such a way that, in addition, the first digital filter is fed a first error signal as a control signal for the setting of the first portion of the first set of coefficients and a second error signal as a control signal for the setting of the second portion of the first set of coefficients, which are derived in each case from the decision feedback equalizer stage, and the second error signal is formed by a difference forming device from a difference between the input signal and the output signal of the decision unit, is described in EP-A-0 707 400.

A similar decision feedback equalizer device is disclosed in U.S. Pat. No. 5,561,687. U.S. Pat. No. 5,561,687 specifies, in particular, an arrangement in which the digital filter of the linear equalizer stage is extended by k coefficients after the main value. This additional portion of the set of coefficients is also referred to as postcursor portion and can be altered in a controllable manner with regard to its coefficients in accordance with U.S. Pat. No. 5,561,687.

When altering the coefficients in the direction of their end values, however, an incorrect behavior can arise if the time constants for the coefficient change and the time constants for the adaptive feedforward portion and the adaptive portion and the adaptive decision feedback portion are not coordinated with one another.

Generally, equalizer devices, in digital communications systems, serve for reducing the intersymbol interference. So-called decision feedback equalizer (DFE) devices are nonlinear equalizers which are useful in particular for channels with severe amplitude distortion.

FIG. 4 shows a schematic block diagram of a known decision feedback equalizer device.

The decision feedback equalizer according to FIG. 4 comprises a feedforward (linear) portion LE and a decision feedback portion comprising a summer S, a decision unit E and a decision feedback equalizer ERE.

The feedforward (linear) portion LE receives a digital input signal IN and supplies it via the line 5 to the summer S, which is connected to the decision unit E via the line 7. The output of the decision unit E, which supplies the output signal OUT, is connected via the line 10 to the input of the decision feedback device ERE and the output thereof is in turn connected via the line 20 to the summer S.

The decision feedback portion of the equalizer compensates for the symbol interferences after the main value of the impulse response which results at the input of the summer S, that is to say downstream of the linear equalizer LE. The symbol interferences before the main value are compensated for by the linear equalizer E.

Usually, both the linear equalizer LE and the decision feedback equalizer ERE are realized with the aid of a nonrecursive filter, the coefficients being set adaptively in order to ensure an optimum setting even with unknown channel properties.

A corresponding more detailed block diagram is shown in FIG. 5.

For the compensation only of the symbol interferences, it suffices, for the definition of the linear equalizer LE, to choose a nonrecursive system with N coefficients, the main coefficient HK being arranged at the last position of the delay chain LK1 having the delay elements T. The coefficients are combined by the coefficient adder KS1.

Within this arrangement although the linear distortions can largely be compensated for, an optimum behavior does not result with regard to noise at the receiver input since the noise is assessed with the frequency response of the equalizer, but the equalizer setting in this case depends only on the line distortions and not on the noise. If the linear equalizer is extended by a few coefficients arranged after the main coefficient, then the resulting noise can also be minimized in addition to the linear distortions.

A nonrecursive system with M coefficients is analogously chosen for the decision feedback equalizer. The coefficients are combined by the coefficient adder KS2.

A receiver arrangement with a decision feedback equalizer has two disadvantages, in principle:

a) error propagation: since the decided symbols serve as input signals for the feedback portion, error propagations can arise in the event of incorrect decisions; and b) the decision has to be carried out within a symbol duration.

Point a) has a particularly adverse effect in the event of severe channel distortions and also in the event of higher-level data signals. Point b) means that it is not possible to employ a Viterbi decision unit since the latter makes the finally decided values available only after a latency of several symbols.

In order to avoid these disadvantages, the decision feedback part of the equalizer is often moved to the transmission end in the form of a precoding (Tomlinson precoding). During a start phase, an arrangement with a decision feedback portion in the receiver is taken as a basis. After run-in, the coefficients of the equalizer are transferred to the transmission end and used as coefficients of the precoder. Afterward, the decision feedback portion in the receiver is disconnected and the precoder in the transmitter is connected. During operation with precoding, the system can no longer adjust itself to the instantaneous noise since the coefficients of the precoder can no longer be altered.

It is expedient, therefore, during the start phase, to enable only the coefficients up to the main value of the linear equalizer and to prescribe the remaining coefficients such that the best possible behavior results in the event of a noise signal with an expected spectral distribution.

It is found, however, that with this procedure the convergence behavior can be greatly impaired during the adaptive setting of coefficients.

SUMMARY

Therefore, it is an object of the present invention to provide an improved decision feedback equalizer device which can ensure both an optimum transient recovery and the best possible noise behavior.

The idea underlying the present invention is that a special control loop is proposed for the coefficient change in order to ensure a reliable run-in behavior. In particular, the first digital filter can be fed a first error signal as control signal for the setting of the first portion of the first set of coefficients and a second error signal as control signal for the setting of the second portion of the first set of coefficients, which are in each case derived from the decision feedback equalizer stage.

In accordance with one preferred development, the second error signal can be formed by a difference forming device from a difference between the input signal and the output signal of the decision unit.

In accordance with a further preferred development, the first error signal is formed by an average value forming device, to which the second error signal is fed.

In accordance with a further preferred development, the average value forming device forms the average value of the magnitude or the square of the second error signal.

In accordance with a further preferred development, the first linear digital filter has a coefficient setting device for setting the first portion of the first set of coefficients, which defines three states depending on the value of the first error signal, in which case the average value of the second error signal is greater than a first predetermined threshold value in the first state, the average value of the second error signal lies between the first predetermined threshold value and a second predetermined threshold value in the second state, and the average value of the second error signal is less than the second predetermined threshold value in the third state, and the coefficient setting device performs the setting in a manner dependent on the present state.

In accordance with a further preferred development, the coefficient setting device is configured in such a way that i) proceeding from the first state, it fixes predetermined start values ($c_{start}$) for the first portion of the first set of coefficients until the third state is reached;

ii) after reaching the third state, it alters the coefficients in the direction of predetermined end values ($c_{end}$) until the second state is reached again;

iii) in the second state, it leaves the coefficients unchanged until the third state is reached again through adaptive setting of the second portion of the first set of coefficients and of the second set of coefficients; and iv) it repeats steps ii) and iii) until the predetermined end values ($c_{end}$) are reached.

In accordance with a further preferred development, the second digital filter can be fed the second error signal as control signal for the setting of the second set of coefficients.

In accordance with a further preferred development, the linear equalizer stage has a third digital filter with an adjustable third set of coefficients.

In accordance with a further preferred development, the third digital filter can be fed the first error signal as control signal for the setting of the third set of coefficients.

In accordance with a further preferred development, the average value forming device has a fourth digital filter, which is a recursive first-order filter.

In accordance with a further preferred development, the fourth digital filter has the transfer function $$H_{average}(z) = q \cdot \left( \frac{1}{1 - (1-q) \cdot z^{-1}} \right)$$

In accordance with a further preferred development, the fourth digital filter has the transfer function $$H_{average}(z) = \frac{q}{2} \cdot \left( \frac{1 + z^{-1}}{1 - (1-q) \cdot z^{-1}} \right)$$

BRIEF DESCRIPTION OF THE FIGURES

Exemplary embodiments of the invention are illustrated in the drawings and are explained in more detail in the description below.

In the figures:

FIGS. 3a and b) show an illustration of the circuit arrangement of a first and a second example for the average value forming unit for the decision feedback equalizer device in accordance with the embodiment of the present invention;

FIG. 4 shows a schematic block diagram of a known decision feedback equalizer device;

DETAILED DESCRIPTION

In the figures, identical reference symbols designate identical or functionally identical constituent parts.

Figure 1:
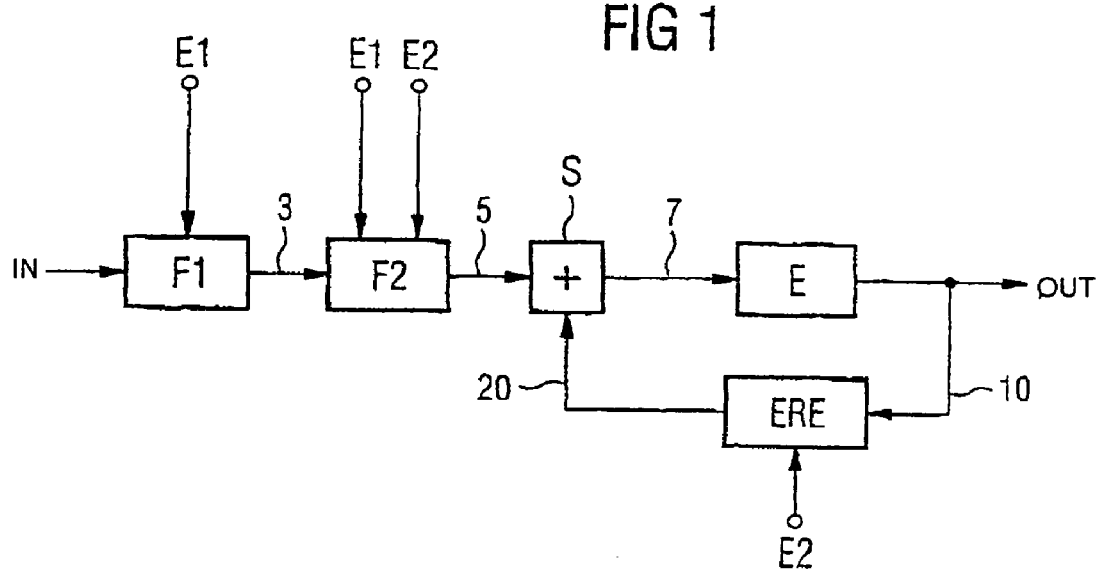
FIG. 1 shows a schematic block diagram of a decision feedback equalizer device in accordance with an embodiment of the present invention.

FIG. 1 is a schematic block diagram of a decision feedback equalizer device in accordance with an embodiment of the present invention.

The equalizer arrangement in FIG. 1 is firstly extended by a further linear filter block F1 with respect to the known equalizer arrangement in accordance with FIG. 4.

The filter block F1 represents a digital filter having preferably a low degree. It may be either a recursive or a nonrecursive filter. By way of example, a first-order system with the transfer function:

$$H(z) = \frac{a + z^{-1}}{1 + b \cdot z^{-1}} \quad (1)$$

may be chosen for the additional filter F1.

Figure 5:
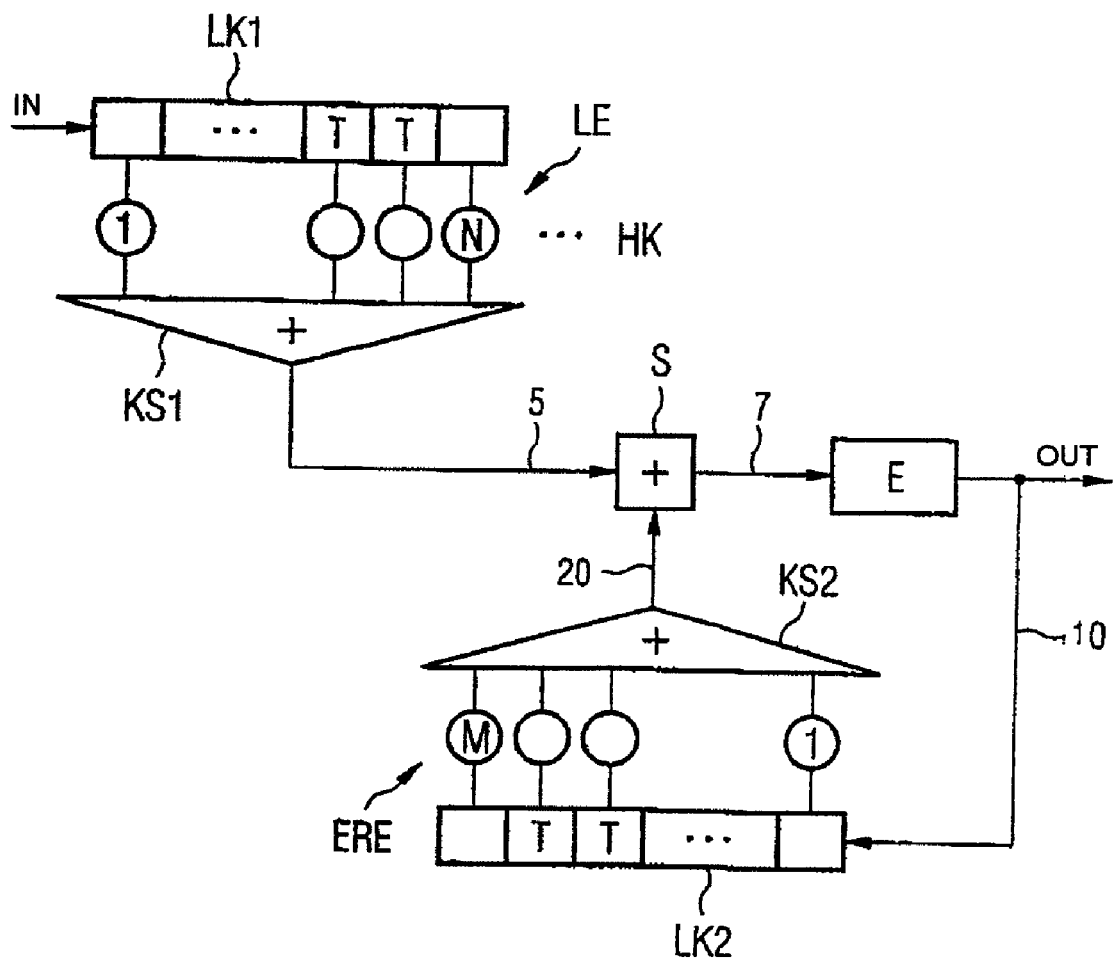
FIG. 5 shows a more detailed block diagram of the known decision feedback equalizer device.

The nonrecursive structure according to FIG. 5 is chosen for the other filter block F2, a few further coefficients being arranged after the main coefficient HK, as known per se from U.S. Pat. No. 5,561,687.

Start and end values are prescribed for the coefficients of the additional filter F1 and for the additional coefficients (postcursor) of the filter F2. In this case, the start values are chosen such that the best possible convergence behavior results therewith. By contrast, the end values are dimensioned with regard to the most favorable behavior possible in the event of coupling in of noise.

After run-in with the start coefficients, these coefficients are altered in the direction of their end values until the end values are reached in each case. During the coefficient change, both the adaptive coefficients of the filter F2 and those of the feedback portion of the equalizer device must be adapted in each case.

In this embodiment, a first and a second error signal E1 and E2, respectively, which are obtained in each case from the decision feedback portion, are used as control signals for the setting of coefficients.

Figure 2:
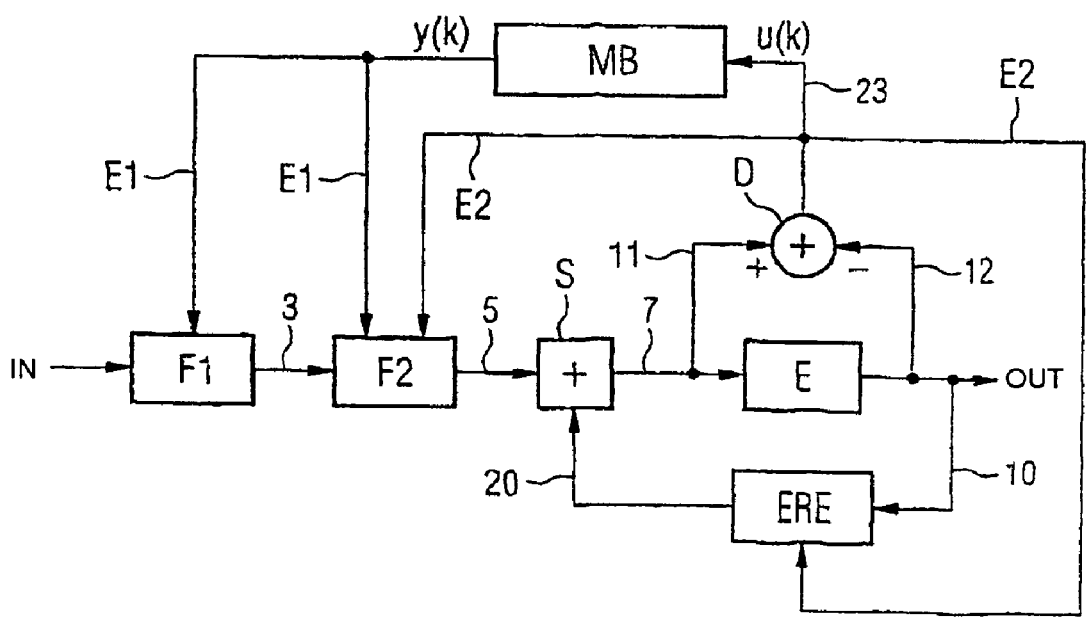
FIG. 2 shows a more detailed block diagram of the decision feedback equalizer device in accordance with the embodiment of the present invention.

FIG. 2 is a more detailed block diagram of the decision feedback equalizer device in accordance with the embodiment of the present invention.

The value generated from the values upstream and downstream of the decision unit E (on line 11 and 12, respectively) by a difference forming device D is used directly as error signal E2 for the adaptive portion of the filter F2. This error signal E2 is also fed to the decision feedback equalizer ERE.

In order to form the error signal E1 for altering the coefficients of the additional filter F1 and the coefficients after the main value of the filter F2 (postcursor) proceeding from the start values in the direction of the end values, use is made of the average value of the error magnitude or the error square (designated by error average value hereinafter), which is formed by a corresponding function block MB, whose input signal is the second error signal E1.

Depending on the error average value, three states are defined as error signal E1 by the function block MB:

State 1: error average value>threshold value 1

State 2: threshold value 2<error average value<threshold value 1

State 3: error average value<threshold value 2

In this case, threshold values 1 and 2 are to be chosen as follows:

In state 1, the system is not synchronized; the error probability is very high in this case (random decisions).

In state 2, although the system is synchronous, the error rate can still be relatively high (clearly more correct than incorrect decisions).

In state 3, a relatively low error rate results (almost only correct decisions).

The setting of coefficients for the filter F1 and the postcursor of the filter F2 is explained in more detail below. As mentioned above, the coefficients of the filter ERE and of the precursor of the filter F2 including the main coefficient HK thereof are set adaptively.

In state 1, the two filters operate with the relevant start coefficients which are chosen in such a way as to ensure a good run-in behavior, but are less suitable for the run-in state. In state 3, the coefficients are altered in a targeted manner in the direction of the end coefficients, and in state 2 the coefficients remain unchanged.

During a setting of coefficients in accordance with this method, firstly in state 1 the system operates with the start coefficients which, as stated, are dimensioned with regard to a favorable convergence behavior, until the system has run in in such a way that virtually no incorrect decisions are taken (state 3). After this state 3 has been reached, the coefficients to be changed are altered until the error average value exceeds threshold 2 (state 2), since the adaptive equalizer comprising feedforward portion and decision feedback portion cannot readjust very rapidly.

In this state, the coefficients to be altered firstly remain unchanged until the adaptive equalizer has readjusted and the error average value is again less than threshold 2 (state 3).

Upon continuing the coefficient change, the error average value hunts around threshold 2 until the coefficients to be altered have reached their end value.

From this point in time, the coefficients of the filter F1 and the postcursor of the filter F2 remain unchanged and the adaptive portions of the equalizer (feedforward portion and decision feedback portion) can finally adjust themselves to the system.

The change of the coefficients proceeding from the start coefficients can be effected by addition of correction values of the same magnitude. With regard to the simplest possible realization, a power of two can be chosen for the correction quantity. In this case, the algorithm for the coefficient alteration can be described in accordance with the following table:

| | |
|---|---|
| $c_{start}$ | In state 1 |
| $c(k) = c(k-1)$ | In state 2 |
| $C(k-1) + 2^{-m} \text{sgn}(c_{end} - c_{start})$ | In state 3 |

In this case, $c_{end}$ is the end value, $c_{start}$ is the start value, k is a discrete time parameter, m is a natural number and sgn is the sign function. The c values represent vectors for the coefficients in this case.

FIGS. 3a) and b) are a respective illustration of the circuit arrangement of a first and a second example for the average value forming unit for the decision feedback equalizer device in accordance with the embodiment of the present invention.

The average value formation can be effected by digital low-pass filtering. A particular simple realization is obtained with a recursive first-order filter.

In FIGS. 3a) and b), MB1, MB2 designate a first and second example, respectively, for a digital averaging filter, NO designates a normalization device, TE designates a half divider and A1 to A4 designate a respective adder.

In accordance with FIG. 3a), the transfer function reads:

$$H_{average}(z) = q \cdot \left( \frac{1}{1-(1-q) \cdot z^{-1}} \right) \quad (2)$$

In accordance with FIG. 3b), the transfer function reads:

$$H_{average}(z) = \frac{q}{2} \cdot \left( \frac{1+z^{-1}}{1-(1-q) \cdot z^{-1}} \right) \quad (3)$$

In this case, q is a normalization parameter of the normalization device NO which defines the averaging time constant. The numerical value of q must be positive and less than one. If $$q = 2^{-L} \quad (4)$$

is chosen for its value, then the filtering can be realized without true multiplications.

With the differential equations $$y(k) = y(k-1) + 2^{-L} \cdot (u(k) - y(k-1)) \quad (5)$$

and $$y(k) = y(k-1) + 2^{-L} \cdot \left(\frac{1}{2} \cdot (u(k) = u(k-1)) - y(k-1)\right) \quad (6)$$

the circuit arrangements illustrated in FIG. 5 result for the averaging filters MB1 and MB2, respectively.

Although the present invention has been described above using a preferred exemplary embodiment, it is not restricted thereto, but rather can be modified in diverse ways.

It was assumed above, without restricting the general validity, that filter F1 represents the additional system for improving the convergence behavior and filter F2 represents the adaptive system with the additional postcursors. However, the order can also be changed.

For the error signal F2, the setting algorithm can also be modified such that only the sign of the error is used.

The invention claimed is:

1. A decision feedback equalizer device having:
   a linear equalizer stage, which has at least one first digital filter with an adjustable first set of coefficients; and
   a decision feedback equalizer stage, which is connected downstream of the linear equalizer stage and has:
      a summer, to which an output signal of the linear equalizer stage is fed;
      a decision unit, to which an output signal of the summer is fed; and
      a decision feedback equalizer, to which an output signal of the decision unit is fed and which has at least one second digital filter with an adaptively adjustable second set of coefficients and which supplies an output signal, which is fed to the summer;
   the first set of coefficients comprising a first adjustable portion arranged behind a main coefficient, and a second adaptively adjustable portion extending up to the main coefficient;
   the first digital filter being fed a first error signal as a control signal for the setting of the first portion of the first set of coefficients and a second error signal as a control signal for the setting of the second portion of the first set of coefficients, which are in each case derived from the decision feedback equalizer stage;
   the second error signal being formed by a difference forming device from a difference between the input signal and the output signal of the decision unit;
   wherein first error signal is formed by an average value forming device, to which the second error signal is fed;
   the first digital filter has a coefficient setting device for setting the first portion of the first set of coefficients, which defines three states depending on the value of the first error signal, in which case
      the average value of the second error signal is greater than a first predetermined threshold value in the first state,
      the average value of the second error signal lies between the first predetermined threshold value and a second predetermined threshold value in the second state, and
      the average value of the second error signal is less than the second predetermined threshold value in the third state,
   and the coefficient setting device performs the setting in a manner dependent on the present state.

2. The decision feedback equalizer device as claimed in claim 1, wherein the coefficient setting device is configured such that
   i) proceeding from the first state, the coefficient setting device fixes predetermined start values ($C_{start}$) for the first portion of the first set of coefficients until the third state is reached;
   ii) after reaching the third state, the coefficient setting device alters the coefficients in the direction of predetermined end values ($C_{end}$) until the second state is reached again;
   iii) in the second state, the coefficient setting device leaves the coefficients unchanged until the third state is reached again through adaptive setting of the second portion of the first set of coefficients and of the second set of coefficients; and
   iv) the coefficient setting device repeats steps ii) and iii) until the predetermined end values ($C_{end}$) are reached.

3. The decision feedback equalizer device as claimed in claim 1, wherein the average value forming device forms the average value of the magnitude of the square of the second error signal.

4. The decision feedback equalizer device as claimed in claim 1, wherein the second digital filter is fed the second error signal as a control signal for the setting of the second set of coefficients.

5. The decision feedback equalizer device as claimed in claim 1, wherein the linear equalizer stage comprises a third digital filter having a adjustable third set of coefficients.

6. The decision feedback equalizer device as claimed in claim 5, wherein the third digital filter is fed the first error signal as a control signal for the setting of the third set of coefficients.

7. The decision feedback equalizer device as claimed in claim 1, wherein the average value forming device comprises a recursive, first-order fourth digital filter.

8. The decision feedback equalizer device as claimed in claim 7, wherein the fourth digital filter has a transfer function represented by:

$$H_{average}(z) = q \cdot \left(\frac{1}{1-(1-q) \cdot z^{-1}}\right)$$

where q is a normalization parameter of a normalization device that defines an averaging time constant.

9. The decision feedback equalizer device as claimed in claim 7, wherein the fourth digital filter has a transfer function represented by:

$$H_{average}(z) = \frac{q}{2} \cdot \left(\frac{1+z^{-1}}{1-(1-q) \cdot z^{-1}}\right)$$

where q is a normalization parameter of a normalization device that defines an averaging time constant.

10. A decision feedback equalizer comprising:
   a linear equalizer stage having
      a first linear digital filter with an adjustable first coefficient set, the first coefficient set including
         a first adjustable portion arranged behind a main coefficient, and
         a second adaptively adjustable portion extending up to the main coefficient, the first linear digital filter being configured to receive
- a first error signal for adjusting the first adjustable portion, and
- a second error signal for adjusting the second adaptively adjustable portion, the first and second error signals being derived from a decision feedback equalizer stage connected downstream from the linear equalizer stage, the decision feedback equalizer stage having
- a summer for receiving a linear equalizer stage output and a decision feedback equalizer output,
- a decision unit for receiving a summer output,
- a decision feedback equalizer for receiving a decision unit output, the decision feedback equalizer including a second digital filter having an adaptively adjustable coefficient set, the decision feedback equalizer being connected to provide a decision feedback equalizer output to the summer, and
- a difference forming device for generating the second error signal on the basis of a difference between the decision unit output and a decision unit input; and
- an average value forming device for receiving the second error signal and generating therefrom the first error signal; and a coefficient setting device for setting the first adjustable portion, the coefficient setting device setting a state on the basis of a present state, the state being selected from
- a first state, in which an average value of the second error signal exceeds a first threshold,
- a second state in which the average value of the second error signal is between the first threshold and a second threshold, and
- a third state in which the average value of the second error signal is less than the second threshold.

* * * * *